United States Patent [19]

Brandenstein et al.

[11] Patent Number: 4,486,056
[45] Date of Patent: Dec. 4, 1984

[54] SUPPORT ROLL AND METHOD FOR INSTALLING THE SAME IN A FRAME MEMBER OR THE LIKE

[75] Inventors: Manfred Brandenstein, Eussenheim; Wilhelm Meyer, Reichmannshausen, both of Fed. Rep. of Germany

[73] Assignee: SKF Kugellagerfabriken GmbH, Schweinfurt, Fed. Rep. of Germany

[21] Appl. No.: 472,170

[22] Filed: Mar. 4, 1983

[30] Foreign Application Priority Data

Mar. 19, 1982 [DE] Fed. Rep. of Germany ....... 3210204

[51] Int. Cl.³ ............................................. F16C 33/78
[52] U.S. Cl. .................................... 384/477; 384/546
[58] Field of Search ................. 308/187.1, 190, 187.2, 308/208, 209; 384/147, 151; 29/110

[56] References Cited

U.S. PATENT DOCUMENTS 1,362,910 12/1920 Zoeller et al.
2,513,599  7/1950 Thomas ............................... 308/190
2,884,665  5/1959 Schlums .............................. 308/190
4,378,136  3/1983 Suzuki ............................. 308/187.1

*Primary Examiner*—Lenard A. Footland
*Attorney, Agent, or Firm*—Eugene E. Renz, Jr.

[57] ABSTRACT

A support roll assembly adapted to be rotatably journalled between spaced frame members comprising an elongated hollow support roll, and support pins mounted in opposite axial ends of said roll, at least one of said support pins being supported in a ball bearing consisting of an outer ring having a generally cylindrical outer race and terminating in a radially inwardly facing thrust shoulder, an inner member having a groove-shaped inner race and formed integrally with the support pin and a plurality of balls arranged in the annular space between the inner and outer races and elastic means in the form of a sealing plug adapted to be mounted in the thrust shoulder of the outer ring and including an axially inwardly yielding elastic wall confronting the inner axial end face of the inner member and fastening means in the form of a fastening screw member engaging in the threaded bore section of the inner member to secure the inner member and support pin to the frame and being of a predetermined configuration so that the inner end of the fastening screw is engageable with the inside front face of the said sealing plug.

7 Claims, 6 Drawing Figures

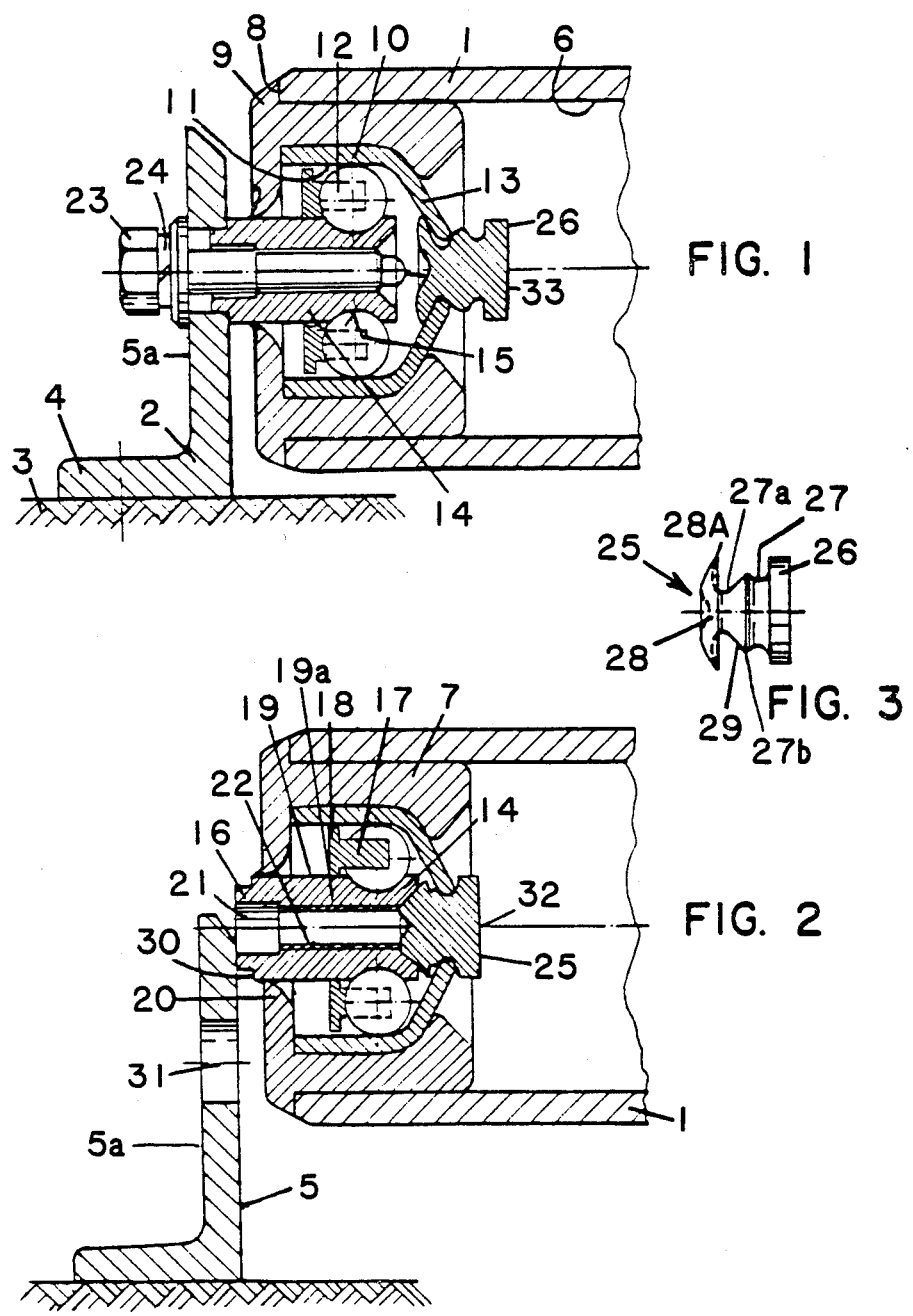

SUPPORT ROLL AND METHOD FOR INSTALLING THE SAME IN A FRAME MEMBER OR THE LIKE

BACKGROUND AND SUMMARY OF THE INVENTION

The present invention relates to support roll assemblies and a novel method of assembling support rolls.

U.S. Pat. No. 1,362,910 discloses a support roll rotatably mounted in axial openings of a frame structure wherein the outer ring of a ball bearing assembly is inserted over an inner part which engages a helical spring on its seating face in the bore of the support roll. In order to provide an appropriate axial clearance of the outer ring in the support roll, it is necessary to provide a narrow radial sliding play between the outer peripheral surface of the outer ring and its seating face in the bore of the support roll. Consequently, manufacture of the support roll is quite expensive by reason of the required critically narrow fabrication tolerances. The necessary sliding play between the outer ring and the support roll is also undesirable in applications requiring accurate bearing support of the support pins with little radial out of balance of the support roll in operation. Additionally, it has been found that installation and assembly of a support roll of this type has certain disadvantages and drawbacks since the outer ring guided with sliding play on its seating face in the support roll may become cocked during axial insertion in the support roll and therefore become jammed. Consequently, the outer ring can be inserted in the support roll over the inner parts and the balls of the ball bearing only by overcoming high bending forces. The danger then exists that the outer and inner race of the bearing are likely to be damaged at the ball contact locations. The assembly process of the support roll of U.S. Pat. No. 1,362,910 is also somewhat cumbersome since a helical spring must be fitted between the outer ring of the ball bearing and a radial shoulder face of the support roll during installation of the bearing in the support roll.

With the foregoing in mind, it is an object of the present invention to provide an improved support roll assembly which eliminates some of the drawbacks and disadvantages of the prior assemblies discussed above. To this end, the support roll assembly includes a bushing mounted in the bore of the support roll at opposite axial ends, a bearing assembly housed in the bushing comprising an outer ring of strip steel having a cylindrical outer race for the balls and a thrust shoulder facing radially inwardly. The assembly further includes an elongated cylindrical member the inner part of which has a raceway for a row of balls and the outer part defines a support pin engageable in openings in the axially spaced support frame members. The cylindrical member has an axial bore for securing the inner part in the opening in the frame by means of a fastening screw member. A sealing plug made of an elastically compressible plastic material engages in the central bore formed at the inner end of the thrust shoulder. By this arrangement, during assembly of the support roll between the frame members, the inner part of the cylindrical member is moved axially inwardly against the elastically yielding wall of the sealing plug and when the support pin aligns with the openings in the opposing frame members, the fastening screw is simply turned to draw the inner part axially outwardly and the assembly of the roll between the frame members is completed. By this arrangement, the danger of overstressing the balls of the bearing assembly during axial insertion of the inner part against the elastic means in the support roll is thus prevented. It is also noted that the assembly process is greatly simplified and at the same time provides a relatively accurate radial bearing support of the support pins of the support roll in the openings of the associated frame members.

In the roll assembly of the present invention, the outer ring is mounted in the bore of the support roll by a tight or press fit which may be accomplished over a relatively wide range of fabrication tolerances which makes manufacture rather economical. Furthermore, by this arrangement, the outer ring is locked in place without radial play in the support roll producing in operation a good smooth running of the support roll. The elastic sealing plug is simple and easy to assemble for installation of the bearing in the support roll at the radially inner end of the outer ring and since the elastically yielding wall of the sealing plug during axial insertion of the inner part abuts or engages the inner axial end of the inner part, this wall as an elastic means which at least partly relieves the balls of the bearing during insertion of the inner part against the thrust shoulder of the outer ring. Thus, a harmful overstressing of the balls during installation of the support pins of the support roll is prevented in this way.

When the fastening screw is threaded into the cylindrical member, the inner axial end displaces the sealing plug to break contact with the support pin thereby eliminating sliding friction between the inner axial end face of the cylindrical member and the sealing plug.

One of the features of the roll assembly of the present invention is the particular configuration of the sealing plug which engages in the bore of the thrust shoulder of the outer ring of the bearing and which during assembly of the support roll between the frame members is in pressure applying relation with the support pin to automatically urge it into the openings in the frame members when it is aligned therewith and which upon assembly of the fastening screw is displaced out of pressure-applying relation to minimize friction during operation of the roll assembly and provides a seal for the annular spaced within which the rolling elements are disposed. To this end, the sealing plug includes an enlarged head portion, a shank having two axially spaced grooves formed therein within which the wall of the thrust shoulder defining the bore seats and a flexible resilient sealing lip at the inner axial end of the shank. Accordingly, when the parts are assembled the sealing plug is pressed in so that the thrust shoulder engages in the innermost groove adjacent the head and now as the elongated cylindrical members at each end are displaced inwardly to allow positioning between the frame members, the elongated cylindrical members at their inner end are in pressure-applying relation with the shank of the plug portion. Now when the support pin is aligned with the opening in the frame member, the elasticity of the plug displaces the elongated cylindrical members outwardly so that the support pin is seated in the opening in the frame member. The fastening screw is then turned into the elongated cylindrical member so that its inner tip end thereof projects beyond the inner end of the cylindrical member to engage the shank portion of the sealing plug and displace it axially so that the thrust shoulder engages in the second annular groove adjacent the sealing lip. More specifically, while the fastening screw is threaded in, the free end of the thrust shoulder snapped in the annular groove of the sealing plug is namely taken from the annular groove to the subsequent conical outside surface of the sealing plug as a result of elastic compressibility of the sealing plug construction material. The sealing plug then presses with its conical outside surface radially outward against the free end of the thrust shoulder so that the sealing plug begins to slide in reaction to the bore surface of the free end of the thrust shoulder. The sealing plug, accordingly, axially moves into the support roll until a radially outward acting elastic power is no longer applied at the radial inner end of the conical surface by the sealing plug or until a radially outward projecting shoulder surface of the sealing plug comes to rest against the outside front face of the free end of the thrust shoulder and consequently impedes a further sliding of the sealing plug in the bore of the free end and at the same time seals the bearing space of the ball bearing towards the inside of the support roll.

In accordance with another feature of the present invention, the sealing plug may be formed as a hollow bulbous member filled with a pressurized fluid and mounted in the opening in the thrust collar with its elastically arched thin wall section aligned with the axial opening in the support pin. Consequently, when the fastening screw is threaded into the support pin, its pointed inner tip end penetrates the elastically arched thin-walled section of the sealing plug whereby the fluid under pressure in the hollow space is discharged into the chamber of the bearing assembly thus relieving the pressure contact with the inner end of the support pin and thus minimizing frictional contact and ensuring smooth running operation of the support roll. The hollow chamber may be filled with a lubricant under pressure so that upon penetration of the elastically arched thin-walled section, the lubricant is discharged into the bearing space and uniformly distributed in the bearing to lubricate the same.

In accordance with another feature of the present invention, the support pin is stepped at its outer axial end to define a shoulder limiting axial outward displacement of the support relative to the frame member when the support pin has been seated in the opening therein.

If the support roll has been stored for some time in a dusty environment, dust or dirt may accumulate in the outer area of the sealing gap of the bearing. In this instance, during penetration of the hollow space of the sealing plug filled with compressed gas, the dust or dirt is blown outward from the sealing gaps of the bearing space to eliminate problems in operation resulting from particulate matter in the bearing.

BRIEF DESCRIPTION OF THE DRAWINGS

These and other objects of the present invention and various features and details of the operation and construction thereof are hereinafter more fully set forth with reference to the accompanying drawings, wherein:

FIG. 1 is a longitudinal sectional view of a support roll in accordance with the present invention showing it installed in the side frame;

FIG. 2 is a longitudinal sectional view of the support roll of FIG. 1 prior to final positioning in the support frame;

FIG. 3 is a side elevational view of the sealing plug in its relaxed state prior to installation;

DESCRIPTION OF THE PREFERRED EMBODIMENTS

Figure 4:
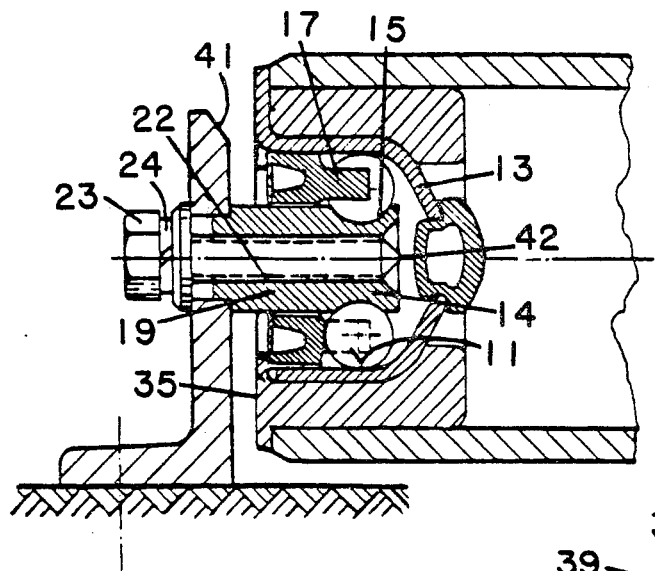
FIG. 4 is a fragmentary longitudinal sectional view of a modified embodiment of support roll in accordance with the present invention.
Figure 6:
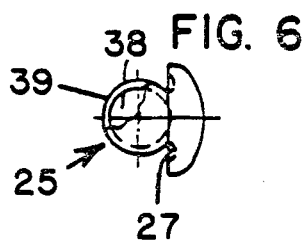
FIG. 6 is a side elevational view partly in section of a sealing plug of the type shown in FIGS. 4 and 5 before installation.

Referring now to the drawings and particularly to FIG. 1 thereof, there is illustrated a support roll generally designated by the numeral 1 constructed in accordance with the present invention. The support roll 1 is adapted to be mounted between opposing spaced-apart frame members 2, only one end of the support roll being shown in the drawings. Each frame member 2 comprises a pedestal or base section 4 secured to a support surface 3 such as a floor by means of screws or the like (not shown) and a vertically extending side flange 5a having an opening 31 within which the support roll assembly is mounted.

Considering now more specifically the means for rotatably mounting the support roll 1 on the frame members 2, a bushing 7 made for example of a plastic material defining an intermediate ring is fitted in the bore 6 of the support roll and has a radially outwardly directed circumferentially extending collar 9 which abuts the outer axial end face of the support roll to locate the bushing in place. A ball bearing is housed in the bushing 7 which consists of an outer ring 10 which may be fabricated of strip steel and which has a generally cylindrical outer race 11 and diverges inwardly at its inner end to form a generally conical thrust shoulder 13. The roll support means further includes an elongated cylindrical member 19 having an inner part 14 with a circumferentially extending groove-shaped inner recess 15 on which the balls 12 track and an outer part defining a support pin 16. The bearing also includes a cage 17 of a conventional type for circumferentially spacing the balls 12. The cage also is formed with an annular ring-like member 18 which is narrowly guided between the cylindrical outer race 11 of the outer ring 10 and the cylindrical outer peripheral surface 19 of the cylindrical member 19a. The annular space for the bearings is sealed at one axial end by a radially inwardly directed sealing lip 20 forming an integral part of the axial end wall of the collar 9.

The support pin 16 has an axially extending bore 21 which has a threaded section 22 to receive a fastening screw 23 to secure the roll assembly in place in the manner illustrated in FIG. 1. A lock washer 24 is mounted between the head of the fastening screw and the outer face of the vertical flange of the support frame 2.

The roll support assembly further includes elastically compressible means cooperatively associated with the elongated cylindrical member mounted in the bore of the thrust shoulder 13 of the outer ring and cooperatively associated with the elongated cylindrical member operative between a first position in pressure-applying relation with the elongated cylindrical member to locate it during assembly in the opening of the frame member and in a second operating position spaced therefrom so that there is no sliding friction in operation between the cylindrical member and the sealing plug and yet the sealing plug seals the bearing space for the ball bearing toward the inside of the support roll. To this end the sealing plug 25 which may be made from an elastically compressible plastic has an enlarged head portion 26, a stepped shank portion defining a first annular groove 27 adjacent the head portion 26 and a second annular groove 27a and a flexible sealing lip 28a at the inner end of the shank portion. The sealing plug 25 has a radially inwardly divergent conical face 29. The inner end of the shank of the plug has a circumferentially extending lip 28a circumscribing and projecting from a center section of a relatively unyielding center section 28 of the plug. The plug as illustrated in FIGS. 1 and 2 is adapted to be mounted in the center bore of the thrust shoulder 13 of the outer ring between a first position (see FIG. 2) wherein the inner terminal edge of the thrust shoulder engages in the groove 27 and the flexible sealing lip 28a is pressed against the conical face at the inner axial end of the elongated cylindrical member in pressure-applying relation therewith so that when the support pin section is aligned with the opening 31 in the frame, the plug moves the pin in an axially outward direction into the opening until the shoulder 30 seats against the inner face of the frame and a second position (illustrated in FIG. 1) wherein the inner terminal edge of the shoulder 13 engages in the groove 27a and the flexible sealing lip presses against the inner wall of the thrust collar 13 to provide a seal during operation of the roll assembly.

Consider now the method of installing the support roll in a pair of spaced frame members 2. Initially the ball bearing consisting of the elongated cylindrical member, the balls 12 and the outer ring 10 with the free end of its thrust shoulder 13 snapped in the annular groove 27 of the sealing plug is assembled in the bore of the intermediate ring 7 and firmly connected thereto by adhesive means, for example. This assembly is achieved by inserting the elements from right to left with respect to FIGS. 1 and 2. Note that the inner end of the intermediate ring 7 has a radially inwardly directed circumferentially extending enlarged portion which snugly embraces the shoulder 13 to retain the parts firmly in place in the collar 9. Next, the intermediate ring 7 with the bearing is axially positioned into the bore 6 of the support roll (from left to right with respect to FIGS. 1 and 2) until the collar section abuts the axial end face 8 of the support roll. In this position the support pin 16 is supported via the ball bearing inside the support roll 1. In this position the elongated members are then urged axially inwardly against the bias of the plug until the distance between the outer terminal ends of the support pins at opposite axial ends are slightly less than the distance between the opposing inner walls 5 of the spaced frame members 2. Note this action may be achieved simply by positioning the roll assembly so that the outer terminal ends of the support pins 16 engage the inwardly inclined surface at the upper ends of the support frames 2. Now as the roll assembly is moved downwardly from the position shown in FIG. 2, the sealing plug 25 at each end will press the support pin into the opening 31 in the frame member when the support pin is aligned therewith. Note that in the present instance during axial displacement of the cylindrical member into the support roll, the balls 12 of the ball bearing are axially moved towards the thrust shoulder 13 of the outer ring. The conical face 32 of the cylindrical member is at the same time pressed against the axially inwardly elastically yielding wall 28a formed by the thin-edged section of the sealing plug 25. To do this, the elastic force of the elastically yielding wall 28a must be overcome. In this process, when the support pin is aligned with the opening 31, the shoulder 30 contacts the inner wall 5 of the frame to limit outward axial displacement of the cylindrical member.

Thereafter fastening means in the form of the screw element 23 is threaded into the axial bore 21 of the support pin and is of a predetermined length so that the tip thereof projects beyond the inner axial end of the cylindrical member and presses axially inwardly against the relatively unyielding section 28 of the sealing plug 25 when fully seated. By this action the sealing plug is pressed axially inwardly to a point where the thrust shoulder is displaced from the annular groove 27 to a position aligned over the juncture 27b to the inwardly directed conical surface 29. At this point the sealing plug 25 presses radially outward with its beveled surface 29 as a result of inherent elasticity against the bore end of the thrust shoulder 13 and is accordingly moved axially inwardly, sliding on the tapered surface 29 until the end of the thrust shoulder 13 comes to rest on the radially outwardly projecting flange or lip of the sealing plug and assumes the position shown in FIG. 1.

Thus, after the fastening screw 23 is completely threaded into the threaded section 22, the sealing plug 25 is displaced axially so that it disengaged from the axial inner end face 32 of the cylindrical member and there is no contact between the inside front face 33 of the fastening screw 23 and the center section of the sealing plug 25. In this manner the plug functions as a tight seal and does not cause frictional drag during operation of the roll assembly.

Figure 5:
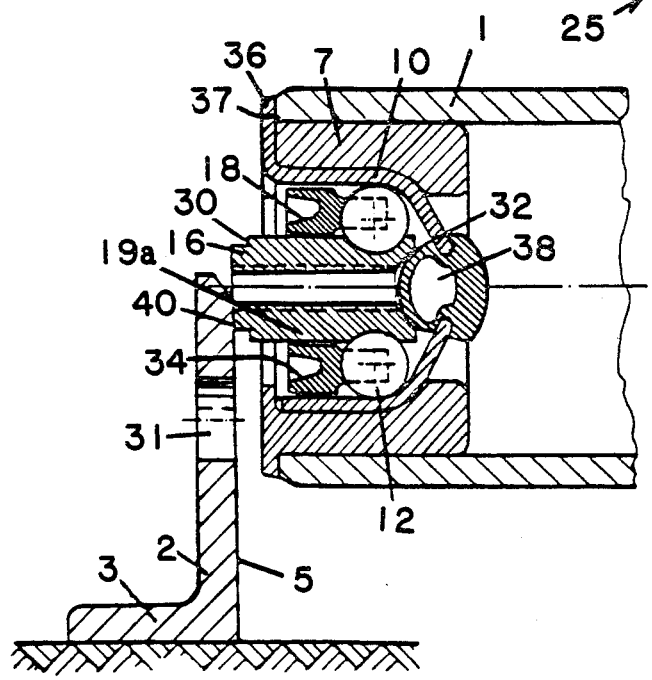
FIG. 5 is a fragmentary longitudinal sectional view of the support roll of FIG. 4 prior to assembly.

There is illustrated in FIGS. 4 and 5 a modified support roll in accordance with the present invention. This support roll assembly which is similar to the principal embodiment is adapted to be rotatably journalled between spaced end frames 2. In this instance, the ball bearing consists of a thin-walled outer ring 10 which may be made of sheet strip metal having a cylindrical outer race 11 and terminating at its inner end a radially inwardly directed conical thrust shoulder 13 and an elongated cylindrical member 19 having an inner part 14 and a support pin section 16 and a circumferentially extending groove 15 defining the inner race for the row of balls 12 which are circumferentially spaced by means of a cage between the inner and outer raceways. In the present instance, the cage 17 has a relatively wide end ring 18 which is narrowly guided with little radial play between the cylindrical bore surface 34 of the outer ring 10 which blends without steps into the outer race 11 and the outside surface 19a of the inner part 14 of the cylindrical member.

During assembly and disassembly of the support roll, the cylindrical member 19 is slidingly locked in place with the aid of the wide end ring 18 against tipping and eccentric misalignment in the outer ring 10. Moreover, the bearing space is sealed to the outside by the narrow gaps between the end ring which functions as a gap seal. A gap seal is formed between the end ring 18 and the bore surface 34.

The outer ring 10 which may be made of thin-walled strip material, for example, strip steel has formed integrally therewith a radially outwardly directed collar section 36 provided with continuous longitudinal slits 35, the collar section being supported axially inwardly at its radially outer end on the axial end face 37 of the support roll 1. As illustrated, the outer ring is supported in an intermediate ring 7 made of a flexible plastic material and may be formed therewith in the ejection molding process.

A sealing plug 25 is mounted in the bore defined by the inner terminal edge of the thrust collar 13. In the present instance, the sealing plug which is preferably made of an elastically extensible elastomeric plastic material comprises a hollow bulbous section 38 which may be filled with a fluid under pressure such as a lubricating grease and an enlarged solid head portion defining therebetween a groove which supports the plug on the thrust shoulder 13 in the manner illustrated.

Considering now installation of the support pins in the complementary openings 31 of the frame, the process is generally the same as described in connection with the embodiments of FIGS. 1 and 2. Thus, during opposed axial insertion of the inner parts 14 of the bearings with the balls to the support roll 1, the inner axial end face 32 of each of the cylindrical members comes into pressure-applying contact with the elastically yielding wall 39 of the sealing plug 25 and the cylindrical members are pressed axially inwardly until the outer axial end faces of the support pins at each end of the roll are at a distance which about equals the opposing distance of the two inner rolls 5 of the frame members 2. This support roll 1 is then displaced downwardly from the upper ends of the frame toward the floor 3 and in this process the edges 40 of the support pins slidingly engage along the inside bevel 41 of the upper end of the slide flanges. When the support roll assembly is displaced downwardly to a point where the support pins are aligned with the openings 31, they are displaced axially outwardly until the shoulder 30 abuts the inside wall 40 surrounding the openings 31 as the result of the elastic force of the elastic wall of the sealing plug 25.

In the present instance, the fastening screw 23 has a sharp pointed inner tip so that when it is threaded into the bore of the elongated member it contacts the wall 39 to penetrate the same to puncture the same so that the fluid under pressure in the bulbous section of the sealing plug is released into the bearing space of the ball bearing. The decrease of fluid pressure in the hollow space relaxes the wall 39 and results in contraction thereof to break the pressure contact with the inside end face 32 of the cylindrical member to the position shown in FIG. 1. Accordingly, in the full threaded position of the fastening screw 23, the support pin 16 is axially locked in place to the frame and in this position the pressure contact between the inner axial end face of the cylindrical member 14 as well as the tip 42 of the fastening screw 23 in the wall 39 of the sealing plug is broken. Thus, there is no friction as a result of contact between these members during operation of the roll assembly.

While particular embodiments of the present invention have been illustrated and described therein, it is not intended to limit the invention and changes and modifications may be made therein within the scope of the following claims. For example, the configuration of the sealing plug may be provided with an annular groove with a cylindrical outside surface to automatically break the pressure contact of the inner face of the fastening screw which as a result of inherent elasticity of the sealing plug is in frictional engagement with the end of the thrust shoulder of the outer ring. Immediately adjacent this outside surface a radially inwardly outside surface which is conically towards the frame may be provided integral with the sealing plug. Additionally, a vertically extending groove of rectangular cross section may be provided on the inner wall of the side flange of the frame which communicates with the opening for the support pin, the groove having a width which is precisely the same or of slightly greater diameter than the support pin. In this way, the support pins can be inserted in the groove which is open at the top of the frame and can simply be slidingly pressed from top to bottom on the base of the groove towards the circular opening in the frame.

It is finally also possible that support rolls are used in the installation according to the process of the invention which are constructed laterally non-symmetrical. With these non-symmetrical support rolls, only the support pin on one side of the support roll is supported by a ball bearing inside the support roll and its inner part together with the balls is axially inserted in the support roll against elastic means in the support roll, in other words, against an axially inward, elastically yielding wall of a sealing plug fastened at the radially inner end of the thrust shoulder. The ball bearing on the other side of the support roll does not have elastic means and may be installed inside the support roll as a bearing axially and radially locking the inner part in place.

SUMMARY

In the process for installing support rolls or the like provided on both sides with support pins (16) each in an axial opening (31) of a frame (2), at least one of the two support pins (16) is supported via a ball bearing having an inner part (14) carrying a groove-shaped inner race (15) for the balls (12) inside the support roll (1), the inner part (14) together with the balls (12) is axially inserted in the support roll (1) against elastic means, the support roll (1) with the two support pins (16) is introduced between laterally opposite inner walls (5) of the two frames (2) and the inner part (14) with its support pins (16) is snapped in axially outward in the opening (31) of the respective frame (2) and fastened by fastening means to the frame (2).

In order to prevent an overstressing of the balls (12) of the ball bearing during installation of the support pin by mounting forces, a cylindrical outer race (11) with on the inside an immediately subsequent radially inward facing thrust shoulder (13) carried by the outer ring (10) of the ball bearing is locked in place in the support roll (1). During the subsequent axial insertion of the inner part (14) in the support roll (1), the balls (12) are axially moved towards the thrust shoulder (13). At the same time, the inner part (14) comes in adherence-actuated contact with an axially inward yielding wall (28a) of a sealing plug (25) fastened to the thrust shoulder as elastic means. After the support pin (16) is snapped in the opening (31) of the respective frame, this adherence-actuated contact is again broken by the fastening means (23) engaging at the sealing plug (25). (FIG. 2).

What is claimed is:

1. A support roll assembly adapted to be rotatably journalled between spaced frame members comprising an elongated hollow support roll, and support pins mounted in opposite axial ends of said roll, at least one of said support pins being supported in a ball bearing consisting of an outer ring having a generally cylindrical outer race and terminating in a radially inwardly facing thrust shoulder, an inner member having a groove-shaped inner race and formed integrally with the support pin and a plurality of balls arranged in the annular space between the inner and outer races and elastic means in the form of a sealing plug adapted to be mounted in the thrust shoulder of the outer ring and including an axially inwardly yielding elastic wall confronting the inner axial end face of the inner member and fastening means in the form of a fastening screw member engaging in the threaded bore section of the inner member to secure the inner member and support pin to the frame and being of a predetermined configuration so that the inner end of the fastening screw is engageable with the inside front face of said sealing plug.

2. A support roll assembly as claimed in claim 1 wherein the front face of the sealing plug confronting the fastening screw has a central unyielding section and including a radially outwardly directed thin walled flexible flange projecting radially outwardly from said central section.

3. A support roll assembly as claimed in claim 1 wherein the sealing plug is made of an elastically compressible matrial and has at least one annular groove on its outer periphery in which the free end of the thrust shoulder of the outer ring engages with a snap fit.

4. A support roll assembly as claimed in claim 3 wherein said sealing plug includes an outer peripheral tapered surface adjacent the groove formed therein which diverges radially inwardly.

5. A support roll assembly as claimed in claim 1 wherein the sealing plug which is made of an elastic material has an enclosed, hollow space or chamber filled with pressurized fluid to define a bulbous thin wall secion confronting the inner front face of the inner member of the bearing and wherein said fastening screw member has a pointed tip disposed so that upon actuation of the screw member to secure the support pin in place, the tip penetrates the thin wall section of the sealing plug.

6. A support roll assembly as claimed in claim 5 wherein the hollow chamber of the sealing plug is filled with a pressurized gas or a pressurized bearing lubricant.

7. A support roll assembly as claimed in claim 1 wherein the inner member is of a stepped configuration defining a circumferential shoulder engaging the inner wall of the frame after the support pin is snapped in an opening in the frame upon assembly.

* * * * *